Nov. 21, 1961    H. H. HUNTER ET AL    3,009,280
FISH HOOK REMOVER
Filed Oct. 10, 1960
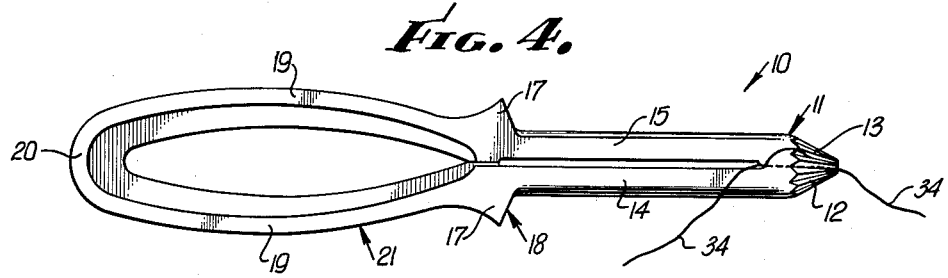
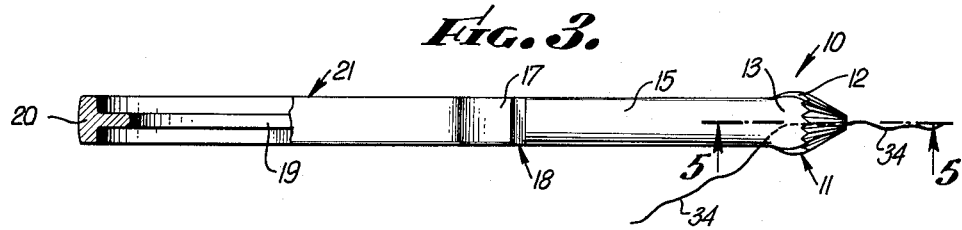
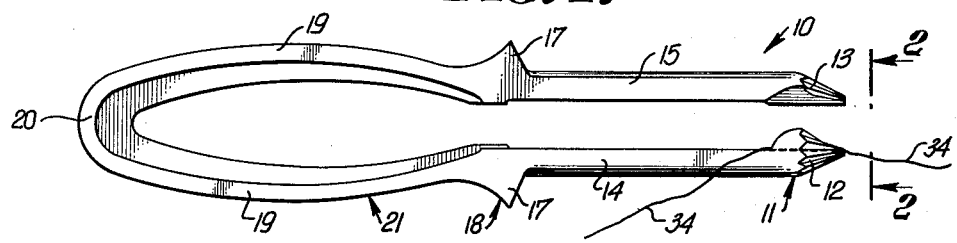
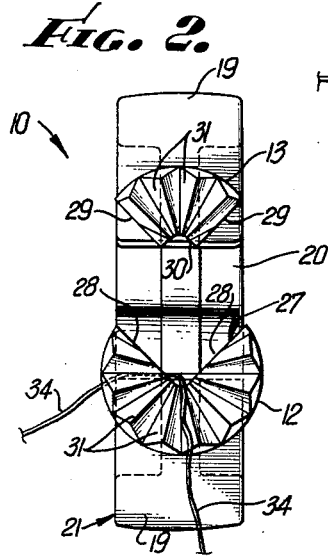
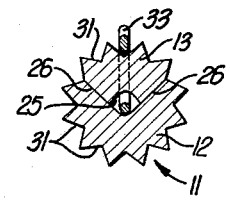
HALE H. HUNTER
GEORGE H. STEVENS
INVENTORS
BY
ATTORNEY.

United States Patent Office 3,009,280
Patented Nov. 21, 1961

3,009,280
FISH HOOK REMOVER
Hale H. Hunter, 5673 Laredo Road, and George H. Stevens, 3355 Arlington Ave., both of Riverside, Calif.
Filed Oct. 10, 1960, Ser. No. 61,681
5 Claims. (Cl. 43—53.5)

This invention relates to fiishermen's equipment and particularly to a device for aiding in withdrawing a hook from the mouth of a fish caught thereon.

Quite a number of different kinds of devices have been provided to accomplish the function above noted. One of these which has been quite popular comprises a rod about seven inches long having a longitudinal groove formed in the side thereof near one end, and an externally serrated head fixed on that end of the rod. An axial hole is formed through the head to connect with said groove, and a slot is formed at a bias extending from the periphery of the head inwardly so as to connect with both the front and rear ends of said axial hole. The mode of using this device, after a fish has been caught and it is desired to remove the hook from the mouth of the fish, is to feed the leader attached to the hook, broadside through said slot into said hole, and then slip the head of the device along the leader and into the mouth of the fish until it engages the hook bringing the point of the hook against the head of the device. By pushing thereon the hook is disengaged from the flesh of the fish and the device and the hook readily withdrawn from the mouth of the fish.

In spite of its excellence otherwise, the device described tends to collect particles of fish flesh in the slot which dry and render it difficult, when subsequently using the device, to admit the leader on the fish hook through the slot into the axial hole in the head of the device.

It is an object of the present invention to provide an improved fish hook remover having all the merits of the aforementioned device and overcoming the drawback pointed out.

Heretofore various styles of pliers have been provided for removing a fish hook from a fish's throat. While these have the advantage of being readily cleanable, the pivots tend to become stuck with rust and their weight and cost are disadvantages.

It is an object of the present invention to provide an integral but connected pair of tongs molded of plastic which is light and corrosion resistant and is easily operable in removing a fish hook from a fish's throat.

Pliers or tongs designed for removing fish hooks depend upon a pair of jaws provided on the front ends of the arms of the tool being automatically brought into proper alignment when the tool is compressed. There is a tendency however for integral but connected tong arms to automatically twist when compressed in the hand and this deflects the jaws on the front ends of the arms transversely out of alignment.

It is a further object of the present invention to provide a unitary plastic tongs for removing a fish hook which overcomes the deficiency of this type of structure applied to this purpose by a very simple and inexpensive expedient.

Conclusion of a fish hook removing operation includes the steps of (1) bringing the tip of the tool into guiding relation with the leader which connects the hook to the fishing line, (2) sliding the tool along the leader into operative engagement with the hook, and (3) pulling on the leader and the tool simultaneously to pull the hook from the fish. Heretofore various expedients were resorted to for accomplishing the final function noted. In the rod-like tool above described, the leader is wound around the finger of the hand holding the tool after the other hand has been used to take up the slack in the leader while the tool is being shifted into engagement with the hook. One of the plier type of fish hook removing tools previously provided has means for locking the arms in closed relation to facilitate the hand holding the tool being similarly used to hold fast to the leader during the final hook removing operation.

It is a still further object of the present invention to provide a fish hook removing tool having means for tightly gripping the leader after the tool engages the hook which is operable by the same hand holding the tool and without the necessity of relaxing the grip of this hand on said tool to take hold of said leader.

The manner of accomplishing the foregoing objects as well as further objects and advantages will be made manifest in the following description taken in connection with the accompanying drawings in which:

FIG. 1 is a side elevational view of a preferred embodiment of the invention illustrating the first step of introducing the leader of the fish hook between two cooperating jaws of the device.

FIG. 2 is an enlarged front end elevational view of the device shown in FIG. 1 with the jaws of the device spaced apart and the leader resting in a V-shaped trough formed in the lower jaw.

FIG. 3 is a plan view of FIG. 1.

FIG. 4 is a side elevational view of the device similar to FIG. 1 showing the two jaws of the device closed on the leader.

FIG. 5 is an enlarged fragmentary sectional view of an end portion of the device taken on line 5—5 of FIG. 3 and after said jaws have been extended along said leader into engagement with the hook attached to the latter.

FIG. 6 is a cross-sectional detail view taken on the line 6—6 of FIG. 5.

Referring specifically to the drawings, the invention is there shown as embodied in a fish hook removing tool 10 which is preferably molded of plastic as a single integral unit. This tool includes a fish hook engaging head 11 which is separated into two parts comprising jaws 12 and 13 which are mounted respectively on the front end of a pair of tong-like arms 14 and 15 which are substantially identical, having bosses 17 which unite to form a hilt 18 for the tool and curved portions 19 which are united by a tool butt 20 to form a handle 21 of the tool.

At its maximum diameter the head 11 is round and is symmetrically formed about a longitudinal axis 22 so as to have a blunt but tapered nose. Extending axially through the head 11 is a hole 25 which is formed when jaws 12 and 13 are assembled together to produce head 11. The head 11 is divided along two radially diverging planes 26 to separate said head into jaws 12 and 13 these planes diverging upwardly to form a trough 27 in the lower jaw 12 and to give jaw 13 a blunt wedge shape having diverging faces 29 which come into face-to-face relation with the faces 28 of trough 27 of jaw 12 when the two jaws 12 and 13 are brought together in assembled relation.

The upper jaw 13 has an axial groove 30 between inner edges of the faces 29 which unites with the axial bottom portion of the trough 27 when the jaws 12 and 13 are in assembled relation to form the axial hole 25.

While the external surface of the tapered nose of the head 11 may be left smooth, and still perform its function in the tool 10, it is preferably provided with a series of radial serrations 31 certain of which are formed on the jaw 12 and the balance on the jaw 13. These serrations are adapted to receive a point 32 of a hook 33 which may be connected to a leader 34 when using the tool 10 in the manner to be described hereinafter.

It is to be noted that jaws 14 and 15 have opposed inner surfaces 35 and 36 disposed forwardly from the guard bosses 17 which are approximately parallel when the tool 10 is freed from restraint as shown in FIG. 1. The surfaces 35 and 36 terminate at their rear ends in shallow bosses 37 and 38 having pinching faces 39 and 40 respectively. By virtue of the handle sections 19 of arms 14 and 15 being connected together at their rear ends by butt 20 and the fact that surfaces 35 and 36 are normally parallel with each other, jaws 12 and 13 come into vertically abutting relation, when the tool handle 21 is compressed in the hand, while pinching faces 39 and 40 of bosses 37 and 38 are still spaced apart. It is also to be noted that the surfaces 35 and 36 are parallel and separated by a free space 41 as shown in FIG. 4 when the handle 21 is fully compressed to bring the jaws 12 and 13 together and also to bring pinching faces 39 and 40 together.

As will be made clear in the description of the operation of tool 10, the faces 39 and 40 are adapted to be employed in the final step of removing fish hook 33 from a fish's throat, to pinch the leader 34 so that a single hand may be employed to grip the tool 10 and the leader 34, leaving the other hand free to hold the fish.

*Operation*

The tool 10 is preferably die cast from a hard but flexible plastic material and comes from the mold as it appears in FIGS. 1 and 2 with the arms 14 and 15 and the jaws 12 and 13 mounted on the ends thereof spaced apart. When using the tool it is held by the handle 21 and the jaws 12 and 13 remain in their open position unless the handle 21 is compressed in the hand with a substantial pressure.

When a fish is caught and landed and it becomes necessary to remove the hook 33 from the fish's mouth, the tool 10 is taken up by the handle 21 in one hand and the jaws 12 and 13 positioned close to the fish's mouth from which the leader 34 extends. This leader is then taken in the other hand and positioned across the open upper end of the trough 27, and the converging faces 28 thereof are employed to guide this leader into the bottom axial portion of said trough. As soon as the leader is thus located, as shown in FIGS. 1 and 2, the handle 21 is compressed to bring the jaws 12 and 13 together as shown in FIGS. 3, 5 and 6 thus trapping leader 34 in the hole 25. However, the handle 21 is not compressed at this time sufficiently to bring pinching faces 39 and 40 together.

Still holding the tool 10 in one hand with this gripping the handle 21 so as to keep the head 11 assembled, and still gripping the leader 34 with the other hand, the tool is now extended into the mouth of the fish, sliding the head 11 along the leader 34 until the stem of the hook 33 is drawn into the hole 25 and the serrated nose of the head engages the point 32 of the hook as shown in FIGS. 5 and 6. The hand holding the leader 34 taut is now extended into the open space between the handle arm portions 19 so that the taut leader extends between pinching faces 39 and 40, whereupon the manual pressure on handle 21 is increased to grip the leader between pinching faces 39 and 40. The tool 10 is then pressed inwardly into the fish's mouth to completely disengage the hook 33 from the flesh of the fish and possibly rotate it if this is necessary to disengage the hook. When this has been done, the hook is free to be withdrawn with the tool 10 from the fish's mouth without any resistance from engagement of the hook with the flesh of the fish.

After the hook 33 has thus been withdrawn from the mouth of the fish, the compression of handle 21 is relaxed to allow the jaws 12 and 13 of the head 11 to separate as shown in FIG. 1 whereupon the tool 10 is readily disengaged from the leader 34.

To properly assess the advantages of the tool 10, it should be noted that while it is in the form of a pair of tongs, it does not grip the fish hook but is limited to gripping the leader 34.

The simplicity of the tool 10 as shown in the drawings, is made possible by the peculiar wide and shallow V-shaped trough 27 provided in the lower jaw 12 and by the wedge-shaped upper jaw 11 which fits in and fills said trough with the exception of the space going to make up the hole 25 of the head 11. The complementary widely angled faces provided on the lower jaw 12 and the upper jaw 13 of the head 11 give practicality to the unitary plastic tongs 10 as this relationship between the jaws 12 and 13 is necessary to overcome the automatic tendency of these jaws to be offset from each other transversely by manual compression of the handle 21. In spite of this offset relation of the two jaws of head 11, as these jaws are being brought together, so that only one of the faces 29 engages one of the faces 28 at the first contact of the upper jaw with the lower jaw, the angled character of these meeting faces shifts the upper jaw into proper complementary vertically abutting relation with the lower jaw as shown in FIGS. 5 and 6 so as to close the hole 25 and trap the leader 34 therein without any attention having to be paid by the operator of the tool to vertically aligning the jaws 12 and 13 to ensure these being brought into matching relation.

The claims are:

1. A tool for removing a fish hook from a fish, said tool being molded integrally from a hard, springy material and comprising upper and lower tong-like arms normally spaced apart and integrally united by a tool butt at their back ends, portions of said arms adjacent said butt being arched apart to form a springy handle for said tool, said handle being adapted to be compressed in the hand to bring front ends of said arms together, said manual compression tending to twist said handle to place said front arm ends in offset relation; and complementary jaws integral with front ends of said arms, said jaws, when juxtaposed in mutual vertical abutment, uniting to form a fish hook engaging head having an axial hole parallel with and communicating with the space between said arms, said hole being of a size larger than and adapted for freely and slidably guiding a leader and hook stem trapped therein, said lower jaw having a wide, shallow V-shaped trough, the bottom portion of which forms the lower half of said hole in said head, said upper jaw comprising a wedge with a groove along its narrow edge, said wedge being shaped to neatly fit said trough, with its groove forming the upper half of said hole in said head, engagement of said wedge with one side of said trough, when said jaws are being brought together in offset relation, automatically correcting said misalignment and guiding said jaws into properly assembled relation to form said head.

2. A combination as in claim 1 in which said arms are still separated by a substantial free open space extending from said jaws rearwardly when the latter are assembled to form said head, there being a pair of pinching faces formed respectively on said arms a substantial distance rearwardly from said jaws, which faces are spaced apart in opposed relation when said handle is first compressed enough to assemble said jaws to form said head, said faces being brought into abutment by increasing the compression of said handle so that a fish hook leader trapped in said hole and entrained between said faces may be thus pinched between the latter whereby a hook on said leader may be withdrawn from a fish by pulling on said tool by the hand compressing said handle.

3. A combination as in claim 2 in which a pair of guard bosses are provided on said arms extending outwardly therefrom at the front end of said handle for the fingers of the hand gripping the handle to rest against; and a second pair of bosses extending inwardly from said arms at the front end of said handle, said pinching faces being provided on said second pair of bosses.

4. A tool for removing from a fish a fish hook attached to the end of a leader, said tool being molded integrally from a hard, springy material and comprising upper and lower tong-like arms normally held in generally parallel spaced relation by a tool butt which integrally unites the back ends of said arms, portions of said arms adjacent said butt being arched apart to form a springy handle for said tool which is adapted to be compressed in the hand to bring front end portions of said arms together; complementary jaws integral with said front end portions of said arms, said jaws, when juxtaposed in mutual abutment by pressure on said handle, uniting to form a fish hook engaging head having an axial hole parallel with said arms and communicating with the space therebetween for freely guiding a leader and a hook stem trapped in said hole, said lower jaw forming a longitudinally disposed trough the bottom of which forms a lower portion of the boundaries of said hole in said head, said upper jaw being shaped to extend downwardly into said trough and fit the latter, with the exception of the space forming said hole, said upper jaw providing an upper portion of the boundaries of said hole; and means forming opposed leader pinching faces on corresponding inner portions of said arms spaced a substantial distance from said jaws and adjacent the front end of said tool handle, which faces are spaced apart when said handle is just compressed enough to assemble said jaws to form said head, to permit a leader trapped between said jaws to be trained between said faces and gripped thereby by increasing the compression of said handle.

5. A tool for removing from a fish a fish hook attached to the end of a leader, said tool comprising upper and lower tong-like arms united in a handle means and normally held in generally parallel spaced relation, said handle means being compressible in a hand to bring front end portions of said arms together; and complementary jaws integral with said front end portions of said arms, said jaws when juxtaposed in mutual vertical abutment by pressure on said handle means, uniting to form a fish hook engaging head having an axial hole parallel with said arms and communicating with the space therebetween, said hole being of a size larger than and adapted for freely and slidably guiding a leader and hook stem trapped in said hole, said lower jaw having a wide, shallow V-shaped trough the bottom portion of which forms a lower portion of the boundaries of said hole in said head, said upper jaw being wedge-shaped to extend downwardly into said trough and with the sides of said upper jaw conforming to the angle of said trough so as to snugly fit the latter, with the exception of the space forming said hole, said upper jaw providing an upper portion of the boundaries of said hole.

References Cited in the file of this patent

UNITED STATES PATENTS

| | | |
|---|---|---|
| 371,639 | Taylor | Oct. 18, 1887 |
| 479,959 | Stanley | Aug. 2, 1892 |
| 777,021 | Hansen | Dec. 6, 1904 |
| 1,454,778 | Wegner | May 8, 1923 |
| 2,519,098 | Aye | Aug. 15, 1950 |
| 2,531,522 | Malouf | Nov. 28, 1950 |
| 2,779,123 | White | Jan. 29, 1957 |
| 2,862,327 | Steinhauser | Dec. 2, 1958 |

UNITED STATES PATENT OFFICE

Certificate of Correction

Patent No. 3,009,280                                                November 21, 1961

Hale H. Hunter et al.

It is hereby certified that error appears in the above numbered patent requiring correction and that the said Letters Patent should read as corrected below.

In the drawings, Figures 1, 4, and 5 should appear as shown below instead of as in the patent:

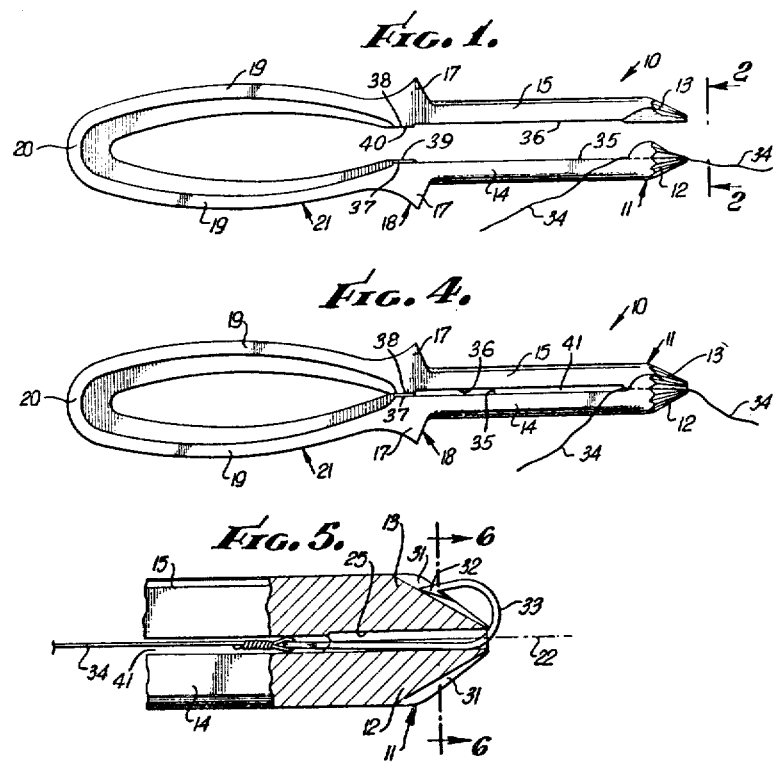

Signed and sealed this 1st day of May 1962.

[SEAL]

Attest:
ERNEST W. SWIDER,
*Attesting Officer.*

DAVID L. LADD,
*Commissioner of Patents.*